C. G. WOODS.
ICE CLEARING TROLLEY.
APPLICATION FILED MAY 27, 1912.
1,086,879.
Patented Feb. 10, 1914.
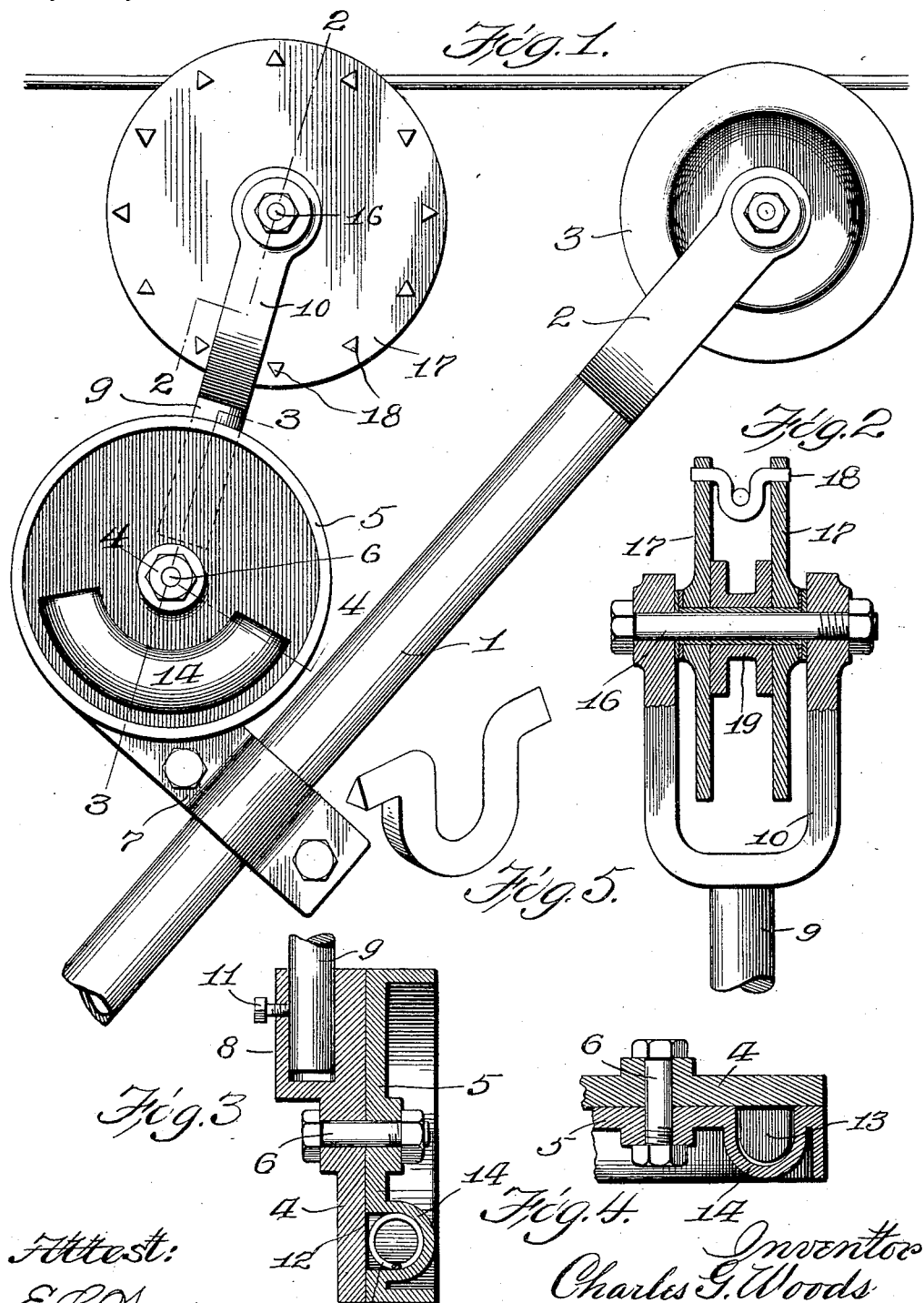

UNITED STATES PATENT OFFICE.

CHARLES G. WOODS, OF ST. LOUIS, MISSOURI.

ICE-CLEARING TROLLEY.

1,086,879.  Specification of Letters Patent.  Patented Feb. 10, 1914.

Application filed May 27, 1912. Serial No. 700,097.

*To all whom it may concern:*

Be it known that I, CHARLES G. WOODS, a citizen of the United States, and resident of St. Louis, Missouri, have invented certain new and useful Improvements in Ice-Clearing Trolleys, of which the following is a specification containing a full, clear, and exact description, reference being had to the accompanying drawings, forming a part hereof.

My invention relates to improvements in ice clearing trolleys, and the object of my invention is to construct a device which may be readily and detachably secured to the pole which carries the trolley wheel so as to carry a wheel having spaced apart elements which contact with the wire in advance of the trolley wheel so that the ice will be cleared from the trolley wire in advance of the trolley wheel.

With the above purposes in view my invention consists in certain novel features of construction and arrangement of parts as will be hereinafter more fully described, pointed out in the claim and illustrated by the accompanying drawings, in which—

Figure 1 is a view illustrating my improved ice clearing attachment applied to a trolley pole; Fig. 2 is a detail, sectional view of the ice clearing wheel taken on the line 2—2 of Fig. 1; Fig. 3 is a sectional elevation of the supporting device for the ice clearing wheel taken on the line 3—3 of Fig. 1; Fig. 4 is a sectional plan taken on the line 4—4 of Fig. 1; and Fig. 5 is a detail perspective on an enlarged scale of one of the ice clearing elements.

Referring by numerals to the accompanying drawings: 1 designates an ordinary trolley pole, 2 a fork carried by the pole and 3 the trolley wheel, the fork and wheel being of ordinary design.

4 and 5 designate the mating halves of the support for the ice clearing wheel, which are each substantially disk-shape and rotatably connected with each other by means of a bolt 6. Carried by and preferably formed integral with the disk 5 is a clamp 7 whereby the disk 5 may be detachably secured to the trolley pole.

8 designates a socket formed in the disk 4 to receive the stem 9 of the fork 10 which rotatably supports the ice clearing wheel.

11 designates a set screw extended into the socket 8 to provide a means whereby the fork may be adjusted relative to the disk 4.

The body of the disk 5 is provided with an opening 12 concentric with the bolt 6, and the disk 4 carries an integral lug 13 which extends through the opening 12. Surrounding the opening 12 is a housing 14 in which is incased an extensile coil spring 15 having one of its ends impinging against the end of the housing 14 and its other end against the lug 13.

The ice clearing wheel, supported in the fork 10 upon the bolt 16, comprises a pair of disks 17 which embrace the bolt 16. These disks are each perforated through their bodies adjacent their peripheries in order to receive the ends of the wire-contacting elements 18. The disks 17 are held apart by means of a sleeve 19 which, together with the disks, rotates in the fork 10 upon the bolt 16.

While I have shown the wire contacting elements of a cross section substantially triangular and at their central portions formed substantially U-shape, I do not wish to be understood as limiting myself to this construction, but I believe this to be the construction which is most efficient.

The triangular cross section presents a sharp cutting edge so as to more rapidly break the ice from the trolley wire and, also serves to prevent the rotation of the contact elements relative to their supports in the disks 17. The U-shaped body portion serves to contact with the sides as well as the bottom of the trolley wire in order to clear the surface of the trolley wire which is engaged by the trolley wheel proper.

The device of my invention is in the nature of an attachment which may be readily taken off of the trolley pole when it is not desired to use it.

In the event that the trolley wire is coated with ice, the device of my invention may be attached to the pole by means of the clamping members 7 and the wire contacting elements 18 are arranged to engage the wire. The spring 15, engaging the lug 13 causes the disk 4 to hold the fork 10 and the disks 17 in positions to hold the wire contacting elements 18 in positions to bear with considerable pressure upon the trolley wire.

I claim:

An ice clearing wheel for trolley wires, comprising a journal, a pair of spaced apart disks carried by the journal, there being a plurality of non-circular openings in each disk adjacent its periphery, a plurality of trolley wire engaging elements, non-circular in cross section, held in the openings in the disks, and means for holding the disks against axial movements.

In testimony whereof, I have signed my name to this specification, in presence of two subscribing witnesses.

CHARLES G. WOODS.

Witnesses:
E. L. WALLACE,
N. G. BUTLER.

Copies of this patent may be obtained for five cents each, by addressing the "Commissioner of Patents, Washington, D. C."